US 8,488,886 B2

(12) United States Patent
Hammond

(10) Patent No.: US 8,488,886 B2
(45) Date of Patent: Jul. 16, 2013

(54) FONT MATCHING

(75) Inventor: Bruce Quincy Hammond, Beaverton, OR (US)

(73) Assignee: Celartem, Inc., Portland, OR (US)

(*) Notice: Subject to any disclaimer, the term of this patent is extended or adjusted under 35 U.S.C. 154(b) by 429 days.

(21) Appl. No.: 12/848,246

(22) Filed: Aug. 2, 2010

(65) Prior Publication Data
US 2012/0027308 A1    Feb. 2, 2012

(51) Int. Cl.
*G06K 9/62*    (2006.01)

(52) U.S. Cl.
USPC ............ 382/209; 382/305; 382/154; 382/190; 382/203; 707/765; 707/804; 707/100; 707/1; 707/102; 707/4; 707/6

(58) Field of Classification Search
CPC .................................................... G06T 7/001
USPC ......... 382/209, 305, 154, 190, 203; 707/765, 707/804, 100, 1, 102, 4, 6
See application file for complete search history.

(56) References Cited

U.S. PATENT DOCUMENTS

| 5,237,627 | A  | * | 8/1993 | Johnson et al. | ............... 382/198 |
| 7,802,184 | B1 | * | 9/2010 | Battilana | ....................... 715/257 |
| 2010/0008581 | A1 | * | 1/2010 | Bressan | ....................... 382/177 |
| 2010/0238178 | A1 | * | 9/2010 | Sawazaki et al. | ............. 345/467 |

OTHER PUBLICATIONS

Bourke, Paul et al. "A Beginners Guide to Bitmaps." Nov. 1993. Downloaded from <http://paulbourke.net/dataformats/bitmaps/>. Accessed Feb. 22, 2013.

* cited by examiner

*Primary Examiner* — Mike Rahmjoo
(74) *Attorney, Agent, or Firm* — Banner & Witcoff, Ltd.

(57) ABSTRACT

Methods, computer readable media, and apparatuses for font matching are presented. A glyph may be received and processed. The processing of the received glyph may include reducing the glyph, computing bounds associated with the glyph, and normalizing the glyph. The processed glyph may be compared to a repository of image prototypes. The comparison may include determining a distance of the processed glyph from one or more the image prototypes, sorting the determined distances, and selecting one or more of the image prototypes based on the determined distances. Additional techniques may be used to enhance the resolution or accuracy associated with the various methods and algorithms.

21 Claims, 6 Drawing Sheets

FONT MATCHING

BACKGROUND

Font recognition programs and algorithms are currently structured to provide a font provider or manager an indication as to patterns of usage. For example, metadata associated with fonts may be collected and analyzed to determine how often a particular set of fonts is selected relative to one or more other sets of fonts. More generally, metadata may be collected and analyzed to determine a frequency of selection of a given (computing) feature relative to another (computing) feature.

Typically, a font provider may associate a name with a particular style of font. In typography, Times New Roman and Arial are common examples of fonts. The letter 'a' may appear stylistically different in a Times New Roman font compared to the letter 'a' in Arial font. If a particular type or style of font is used frequently enough, a user may gain a level of familiarity with the font. However, there are numerous styles of fonts that are either already in existence or are being created. As the number of font options increase, it may become increasingly difficult to recall a particular font name or identify a particular font.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to the creation and maintenance of a repository. In some embodiments, the repository may contain image prototypes of one or more fonts or font glyphs. In one example, an image prototype may include a single font glyph (e.g., a single character defined for the font). The image prototypes may be stored in the repository in one or more formats. For example, a bitmap format may be used in some embodiments. In some embodiments, a rendered bitmap for an image prototype may have a 1-bit depth. Bounds associated with a prototype image may be computed in some embodiments. Additionally or alternatively, a prototype image may be normalized. The normalization may result in the prototype image having a predetermined width and/or height. For example, all image prototypes in the repository may have the same normalized width and/or height.

Aspects of this disclosure may further relate to matching a glyph to image prototypes stored in the repository to identify the font to which the glyph belongs or a similar font. In some embodiments, a received glyph may be reduced to a 1-bit depth bitmap format. Bounds associated with the received glyph (and/or the glyph as reduced to a 1-bit depth bitmap) may be computed. The received glyph may undergo normalization. For example, performing the normalization may result in the received glyph being made a predefined width and/or height. In some embodiments, a comparison between one or more image prototypes stored in the repository and the (formatted, normalized) received glyph may be performed to determine one or more potential matching font candidates. The comparison performed may include computing an error or distance score between the (formatted, normalized) received glyph and the one or more image prototypes stored in the repository.

Other details and features will also be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings and in which like reference numerals refer to similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
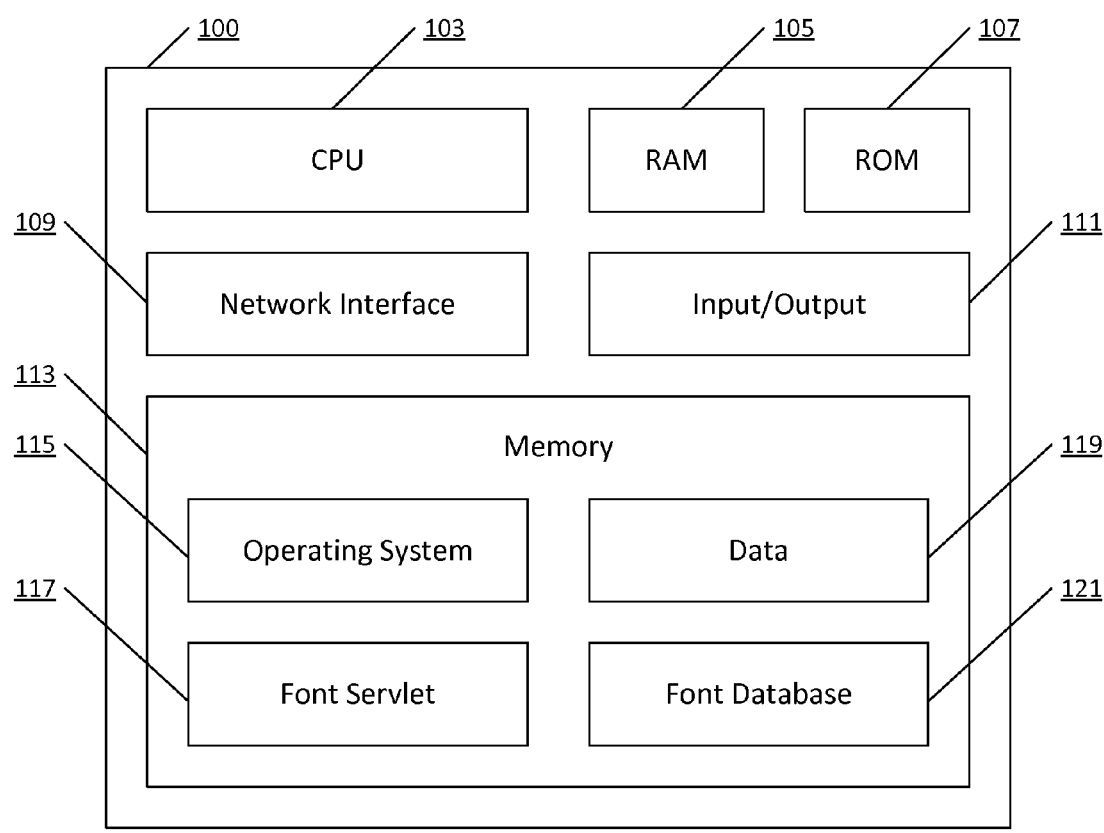
FIG. 1 illustrates an example system in which one or more aspects of the disclosure may be implemented.

FIG. 1 illustrates an example system in which one or more aspects of the disclosure may be implemented. In one or more configurations, one or more aspects described herein may be implemented as a computer program and/or a combination of computer programs for use with a computer 100 and/or stored in memory 113. Computer 100 represents a generic computing device, e.g., a desktop computer, laptop computer, notebook computer, network server, portable computing device, personal digital assistant, smart phone, mobile telephone, distributed computing network device, and/or any other device having the requisite components and/or abilities to operate as described herein and thereby be configured as a special-purpose device according to one or more illustrative aspects of the disclosure. Computer 100 may include central processing unit or other processor 103, RAM or other volatile memory 105, ROM or other boot memory 107, network interface(s) 109 (e.g., Ethernet, wireless network interface, modem, etc.) through which computer 100 may connect to a wide area network and/or local area network (e.g., Internet, LAN, WAN, PAN, etc.), input/output port(s) 111 (e.g., keyboard, mouse, monitor, printer, USB ports, serial ports, parallel ports, IEEE 1394/Firewire ports, and the like), and nonvolatile memory 113 (e.g., fixed disk, optical disk, holographic storage, removable storage media, flash drive, etc.). Computer 100 may store various programs, instructions, applications, and data in memory 113, including, but not limited to, operating system software 115, font servlet 117 (e.g., one or more plug-ins and/or other font software described herein), data 119 (e.g., documents, files, and other data described herein), and font database 121 (e.g., one or more font files and/or other files described herein).

One or more aspects of the disclosure may be embodied in computer-usable data and/or computer-executable instructions, such as in one or more program modules, executed by one or more computers or other devices to render one or more fonts for output on a device such as a display or a printer. Generally, program modules include routines, programs, objects, components, data structures, etc. that perform particular tasks or implement particular abstract data types when executed by one or more processors in a computer or other data processing device. The computer-executable instructions may be stored on a computer-readable medium such as a hard disk, optical disk, removable storage media, solid state memory, RAM, etc. As will be appreciated, the functionality of the program modules may be combined or distributed as desired in various embodiments. In addition, the functionality may be embodied in whole or in part in firmware or hardware equivalents, such as integrated circuits, field programmable gate arrays (FPGA), and the like. Particular data structures may be used to more effectively implement one or more aspects of the disclosure, and such data structures are contemplated to be within the scope of computer executable instructions and computer-usable data described herein.

Figure 2:
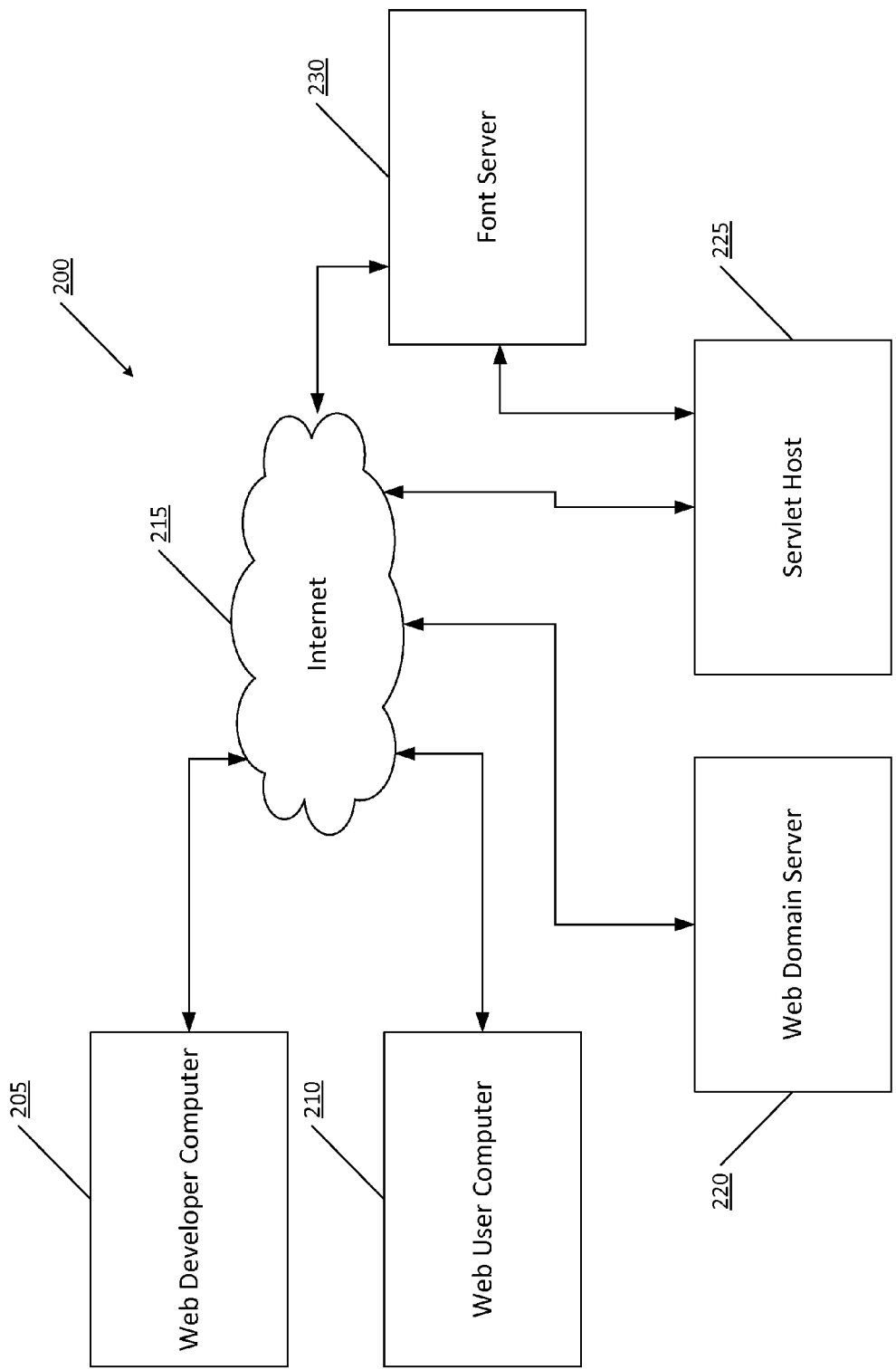
FIG. 2 illustrates an example network environment in which one or more aspects of the disclosure may be implemented.

FIG. 2 illustrates an example network environment 200 in which one or more aspects of the disclosure may be implemented. Network environment 200 may include one or more computers, such as web developer computer 205, web user computer 210, web domain server 220, servlet host 225, and font server 230. In addition, network environment 200 may contain one or more local area networks ("LANs") and/or one or more wide area networks ("WANs," e.g., the Internet 215).

According to one or more aspects, web developer computer 205 may be a computer used by a website developer or other user in designing and developing a website and/or Cascading Style Sheets ("CSS") code. CSS is a style sheet language by which one or more style parameters of a structured document, such as a webpage, may be controlled and/or modified. For example, a user may define fonts and font styles for text that is to be displayed in the webpage using the CSS. Accordingly, rather than having to replicate and/or include the font or font style coding directly in each webpage, a webpage may reference or call the relevant CSS. Multiple webpages may use the same CSS if they are using the same font or font styles and other stylistic attributes defined in the CSS.

Web user computer 210 may be a computer used by a web user in browsing one or more websites and webpages on the Internet 215. Web domain server 220 may be a computer in which one or more websites and/or CSS code is stored and/or from which one or more websites and/or CSS code is served in response to remote requests. Servlet host 225 may be a computer in which one or more font-request processing and/or or font serving computer programs and/or scripts are stored according to one or more aspects further described herein. Font server 230 may be a computer in which one or more fonts and/or one or more font databases are stored according to one or more aspects further described herein.

For example, a website developer may use web developer computer 205 to design and develop a website that includes CSS code. Subsequently, the website developer may upload the website/webpage, via the Internet 215, to web domain server 220. Alternatively or additionally, the website developer or other user may develop a website/webpage on domain server 220 remotely from developer computer 205. Thereafter, a web user may use web user computer 210 to access the website/webpage via the Internet 215. In accessing the website or webpage and executing the CSS code contained therein, the user may trigger a font request. As a result of triggering the font request, web user computer 210 and/or web domain server 220 may transmit a font request to servlet host 225. The font request may include a font request server address, a customer identifier, a security token, a font name, a font file name, and/or combinations thereof. In response to receiving the font request, servlet host 225 may process the font request, which may include parsing the font request, evaluating the font request server address, the customer identifier, security token, and/or the font name or font file name. If the servlet host 225 determines that the font request is invalid or unauthorized, the servlet host 225 might not take any further action or the servlet host may transmit a message denying the font request or other provide some other similar response. On the other hand, if the servlet host 225 determines that the font request is valid and/or authorized, the servlet host 225 may request one or more fonts corresponding to the font request from font server 230. In response to such a request, the font server 230 may transmit the one or more fonts corresponding to the font request to the servlet host 225, the web domain server 220, and/or to the web user computer 210. Additionally or alternatively, in response to receiving the one or more fonts corresponding to the font request from the font server 230, the servlet host 225 may transmit the one or more fonts corresponding to the font request to the web domain server 220 and/or web user computer 210. Thereafter, in response to receiving the one or more fonts corresponding to the font request, web user computer 210 may display and/or print the website with the one or more received fonts.

While network environment 200 is described as including various computers adapted to perform various functions, it should be understood that the system may be modified to include a greater or lesser number of computers which may be used alone or in combination to provide the same functionality. For example, a single computer may be used to perform all of the functions described, and one or more users may interact with the single computer through one or more terminals and/or user interfaces. In another example, a first computer may be used to perform all of the functions of web developer computer 205 and web user computer 210, and a second computer may be used to perform all of the functions of web domain server 220, servlet host 225, and font server 230.

Figure 3:
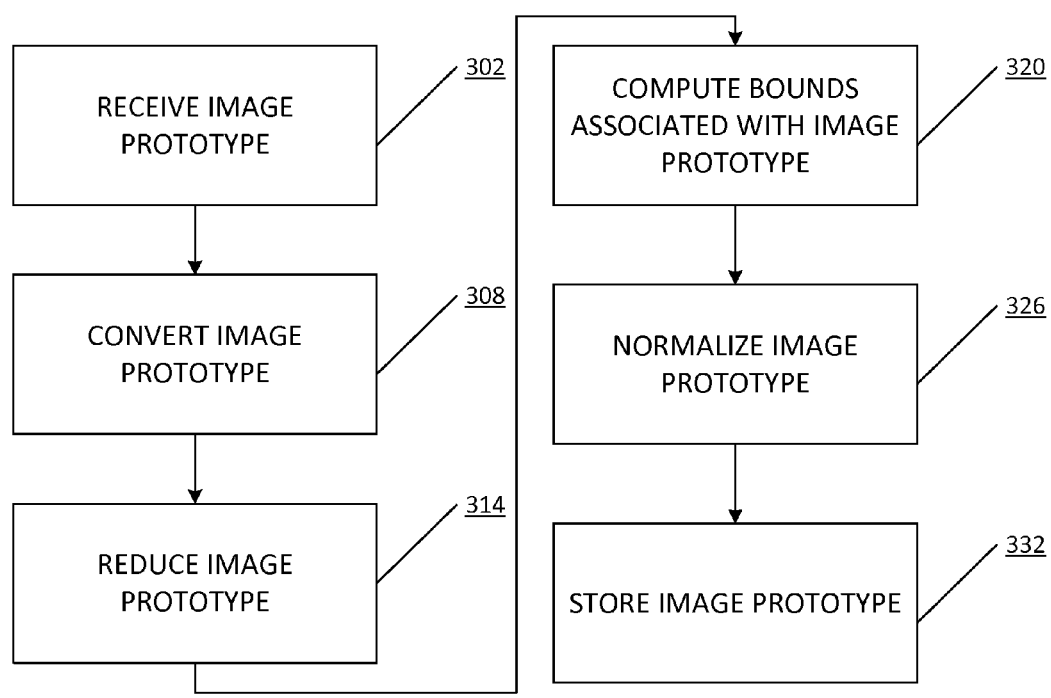
FIGS. 3-5 illustrate one or more methods according to one or more aspects described herein.

FIG. 3 illustrates a method by which a repository may be created and maintained in accordance with one or more aspects of this disclosure. The repository may include one or more databases that may be included in, or coupled to, one or more computing platforms (e.g., any combination of the computing entities described above in connection with FIGS. 1 and 2). In step 302, an image prototype may be received (or more specifically, information or data corresponding to one or more glyphs to be prototyped may be received). The image prototype may be received as a data file using one or more communication mediums or protocols. Alternatively or additionally, receipt of an image prototype may include a step of creating the image prototype, optionally at one or more computers. The image prototype may correspond to a font type to be added to the repository, and may include one or more glyphs representative of symbols, characters, numbers, and the like.

In step 308, the received image prototype may be rendered or converted into one or more formats. For example, the received image prototype may be converted into a bitmap format. Formats other than, or in addition to, bitmap may be used in some embodiments.

In step 314, the image prototype may undergo a reduction process. For example, 1-bit depth bitmap reduction may be used. Reduction from color images to 1-bit depth images may be supplied by an entity, such as graphics services associated with a host operating system (for example). The reduction process may be used to facilitate a comparison described below in connection with FIG. 4.

In step 320, bounds associated with the image prototype may be computed. The bounds may be used to determine the size or extent of the image prototype. For example, in the context of a text document, the computed bounds may be used to determine where a first glyph (e.g., a character) ends and where a second glyph (e.g., a numeral) begins, where the first and second glyphs are adjacent to, next to, or near one another. In one particular example, a system may perform image analysis to identify a left most pixel, right most pixel, top most pixel and bottom most pixel of the glyph. The computed bounds may also be used to facilitate a normalization process as described in connection with step 326.

In step 326, a normalization process may be conducted with respect to the image prototype. In some embodiments, the normalization may include normalizing the image prototype to be a predefined width and height. For example, the width may be one-hundred twenty eight (128) pixels. Other values (e.g., 32, 64, 256, etc.) could be used for (pixel) width in some embodiments. In some embodiments, the normalization may take place in a lengthwise or height dimension, and the width may be scaled proportionately. The bounds computed in connection with step 320 may be used to achieve proportionality in the image prototype following the reduction.

In step 332, the image prototype may be stored in the repository following one or more of the operations described above.

In some embodiments, a subset of glyphs may be subjected to the operations described above in connection with FIG. 3. In those embodiments, the rest of the glyphs may either be discarded in or may be subject to one or more steps of FIG. 3, but allocated to a temporary storage in connection with step 332. Providing different treatment to different glyphs in an image prototype may be desirable in some embodiments. For example, different treatment may be used in embodiments where memory/storage capacity and/or processing resources and/or power supply capacity (e.g., such as in a battery-powered device) are limited. In those embodiments, various criteria may be used to determine which glyphs to store. For example, glyphs that are expected to be frequently used may be stored (e.g., vowels or punctuation), whereas those glyphs that are not expected to be frequently used may either be discarded or allocated to temporary storage.

Figure 4:
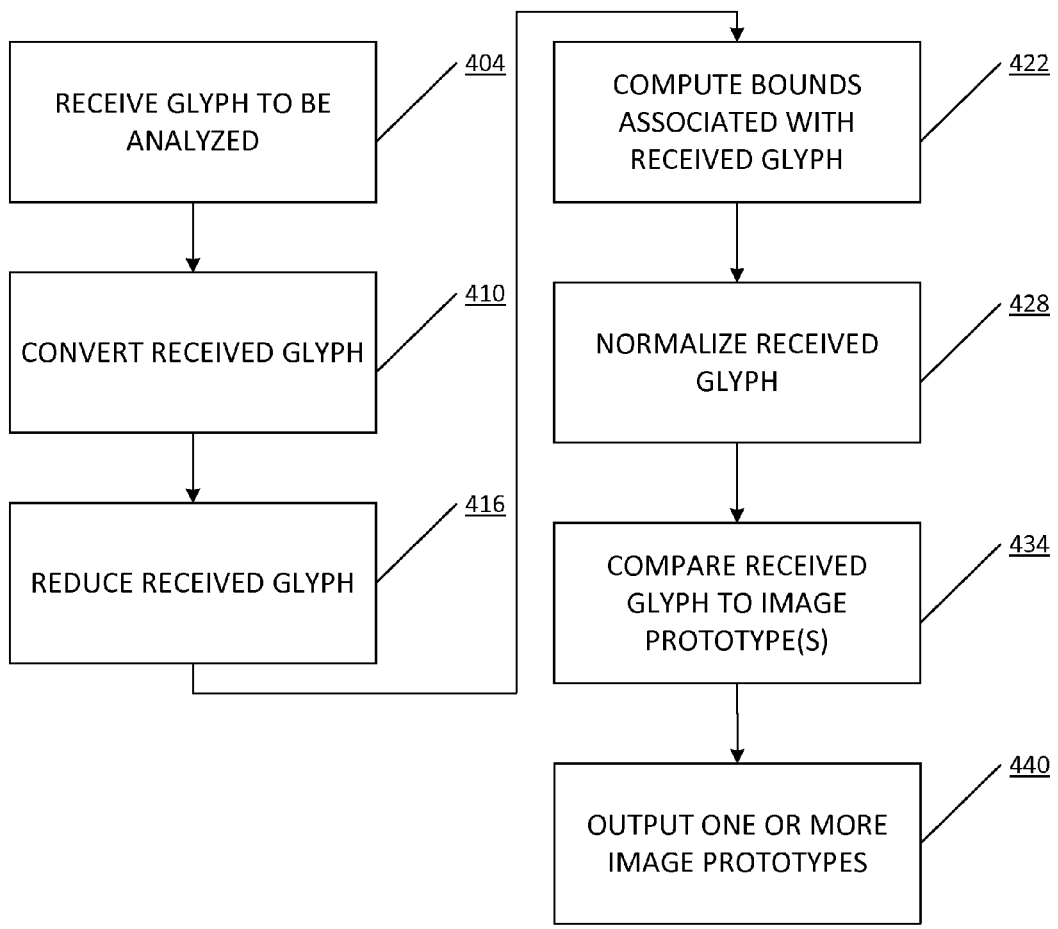

The method of FIG. 4 may be used in connection with the method of FIG. 3 to match a received glyph to one or more image prototypes. In step 404, a glyph to be analyzed may be received. The glyph may be received via one or more computing entities (e.g., one or more of the computing entities shown in FIGS. 1 and 2). The glyph may be received as a scanned image (e.g., a facsimile or fax), an email, a (text) message, as a file or document, or the like.

In step 410, the received glyph may be converted into one or more formats. For example, the conversion of step 410 may correspond to the conversion performed in connection with step 308 of FIG. 3. Thus, in embodiments where the conversion associated with step 308 entails generating a bitmap, step 410 may include generating a bitmap of the glyph received in step 404.

In step 416, the received glyph may be reduced. For example, the reduction of step 416 may correspond to the reduction performed in connection with step 314 of FIG. 3. Thus, in embodiments where the reduction associated with step 314 results in a 1-bit depth bitmap, step 416 may include reducing a bitmap of the received glyph to a 1-bit depth.

In step 422, bounds associated with the received glyph may be computed. The computed bounds may be used to determine the size or extent of the received glyph. The computed bounds may also be used to facilitate a normalization process as described in connection with step 428.

In step 428, a normalization process may be conducted with respect to the received glyph. In some embodiments, the normalization may include normalizing the received glyph to be a predefined width and/or a proportional height. For example, the predefined width may be one-hundred twenty eight (128) pixels. Other values (e.g., 32, 64, 256, etc.) could be used for (pixel) width in some embodiments. In some embodiments, the normalization may take place in a lengthwise or height dimension, and the width may be scaled proportionality. In one example, the predefined width and height may match the predefined width and height of the image prototypes stored in the repository. The bounds computed in connection with step 422 may be used to achieve proportionality in the image prototype following the reduction. In some embodiments, the normalization of step 428 may correspond to the normalization conducted in connection with step 326 of FIG. 3 in order to facilitate a comparison described below in connection with step 434.

In step 434, a comparison may take place between the received glyph (following the processing performed in connection with steps 404-428) and one or more of the image prototypes stored in the repository in connection with step 332 of FIG. 3. In some embodiments, one or more of the image prototypes may be output in step 440. The illustrative algorithm shown in FIG. 5 and described below may be used to perform the comparison and outputting of steps 434 and 440 of FIG. 4.

Step 1: for a selected image prototype stored in the repository, set a first variable (henceforth referred to as error_accumulator) to zero. The error_accumulator may provide an error or distance score between the selected image prototype and the received glyph.

Step 2: set a second variable (henceforth referred to as min_num_rows) equal to the lesser of the number of rows in the selected image prototype and the number of rows in the received glyph.

Step 3: for every row up to min_num_rows, exclusive-or (xor) the received glyph with the selected image prototype and accumulate (e.g., add) to the error_accumulator the count of bits where the output of the exclusive-or is a '1' or 'true.' The xor function performed in connection with this step may correspond to a pixel-by-pixel xor operation between the received glyph and the selected image prototype, where a value of '1' or 'true' for each pixel of the received glyph and the selected image prototype corresponds to the pixel being 'on' or 'black' and a value of '0' or 'false' for each pixel of the received glyph and the selected image prototype corresponds to the pixel being 'off' or 'white.'

Step 4: for every row beyond the rows compared in connection with Step 3, in either the received glyph or the selected image prototype (whichever has the greater number of rows), count the number of SET bits (e.g., the number of bits where, using a grey-scale image, the bit in the image is black or present) in the row, adding the count to the error_accumulator.

Step 5: save the error_accumulator value as a score for the selected image prototype.

Step 6: determine whether all candidate image prototypes have been accounted for, repeating steps 1-5 for each candidate image prototype stored in the repository. The candidate image prototypes may include all of, or a subset of, the image prototypes stored in the repository.

Step 7: sort the scores that were saved in connection with step 5, thus obtaining a sorted list of scores for the candidate image prototypes.

Step 8: determine that the lowest of the sorted scores corresponds to the image prototype that most closely matches the received glyph. In some embodiments, the image prototype that most closely matches the received glyph may be output. The output may comprise one or more of a display screen suitable for display on a display device (e.g., a computer monitor), an email, a text message, a document, an audio message, or the like.

Figure 5:
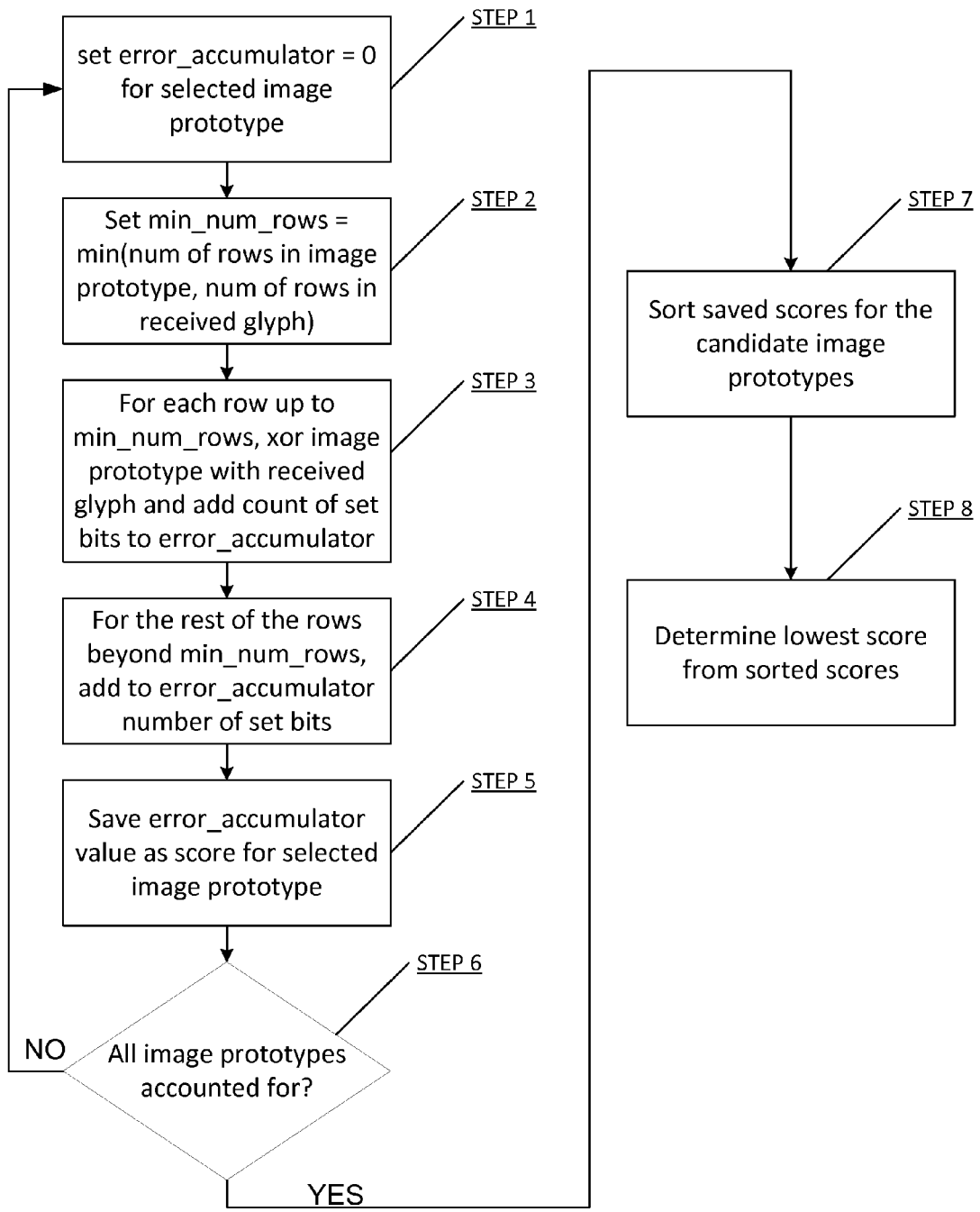
Figure 6:
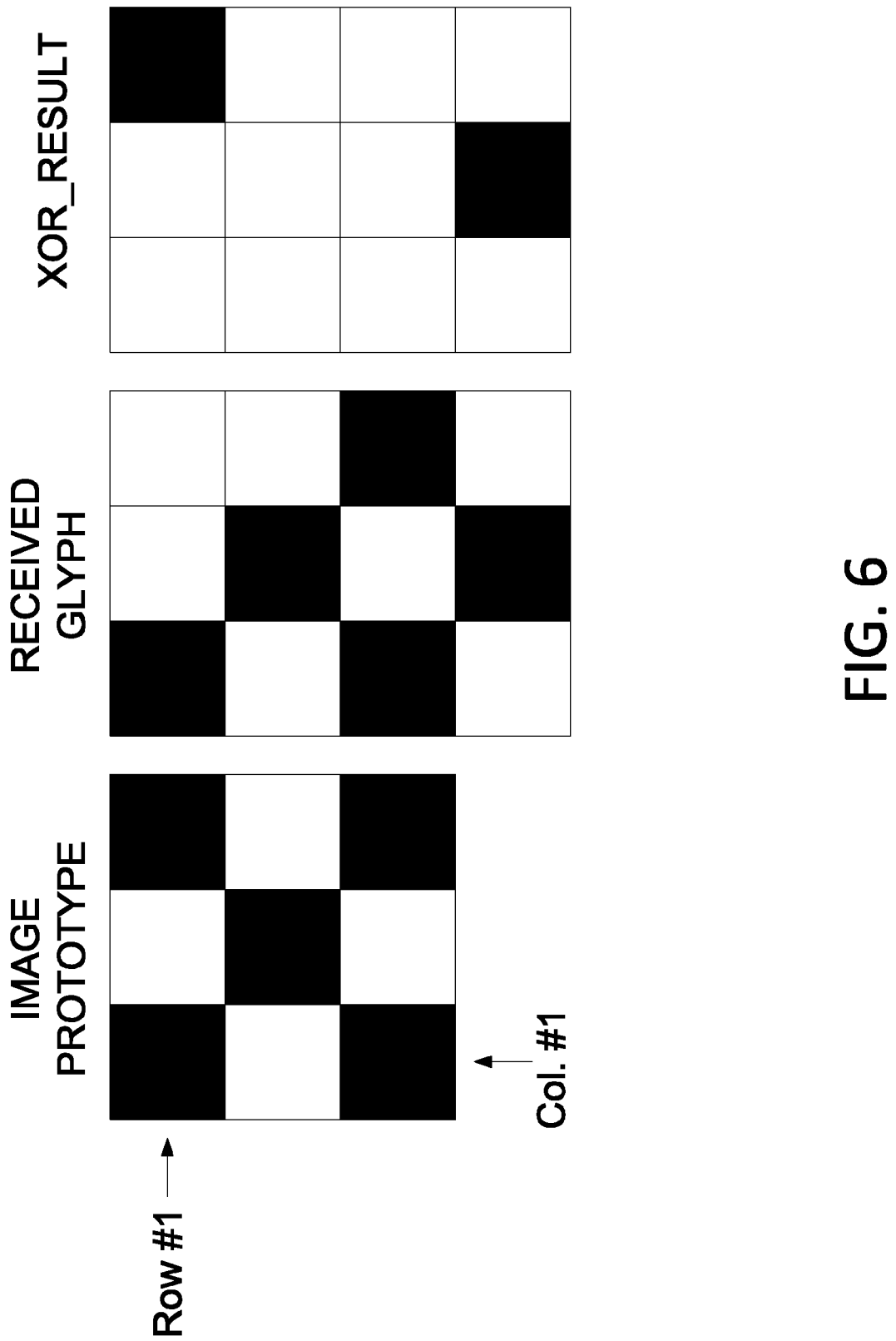
FIG. 6 illustrates an image prototype and glyph in accordance with one or more aspects of this disclosure.

FIG. 6 illustrates a visual representation of steps 1-5 described above in connection with FIG. 5. In FIG. 6, an image prototype is shown as having three rows and three columns and crudely taking on the shape of an 'X.' A received glyph, potentially having undergone the processing associated with FIG. 4, may have four rows and three columns. Thus, the minimum number of rows (as determined by step 2 of FIG. 5) is three, corresponding to the three rows of the image prototype. In accordance with step 3 of FIG. 5, a pixel-wise xor operation between the image prototype and the received glyph may occur for each of the three rows, and the results are shown in the first three rows of the xor_result portion of FIG. 6, where the shaded box in row #1, column #3 of the xor_result reflects the corresponding pixel in the image prototype being 'on' or 'black', and the corresponding pixel in the received glyph being 'off' or 'white.' Thus, based on the xor operation, the error_accumulator may have a value of one following the completion of step 3 of FIG. 5. In accordance with step 4 of FIG. 5, the pixels of the fourth row where the pixel is 'on' or 'black' in the received glyph may be summed or added. This is reflected in FIG. 6 by the shading of the pixel in row #4, column #2 of the xor_result tracking the corresponding pixel being 'on' or 'black' in the received glyph in row #4, column #2. Thus, the error_accumulator would be incremented by one in connection with step 4 of FIG. 5, resulting in an error_accumulator value of two following the completion of step 4 of FIG. 5. This error_accumulator value of two may be saved in connection with step 5 of FIG. 5 for this particular image prototype.

The process described above in connection with FIG. 6 may be repeated (in connection with step 6 of FIG. 5) for any additional candidate image prototypes (not shown in FIG. 6) in order to determine which of the candidate image prototypes have the lowest scores (in connection with steps 7 and 8 of FIG. 5) for the received glyph shown in FIG. 6.

The representation shown in FIG. 6 is illustrative. Different image prototype and/or glyphs may be used in some embodiments. For example, the width of the image prototype and glyph shown in FIG. 6 corresponded to three pixels for purposes of illustrative simplicity. Other dimensions may be used in some embodiments.

Variations of the above-described methods and architectures are possible in some embodiments. For example, in some embodiments, multiple passes of the methods shown in FIGS. 3 and 4 may be conducted in order to obtain a "best-fit" result or in order to enhance or improve accuracy.

In some embodiments, the computation of the bounds associated with step 320 of FIG. 3 and/or the bounds associated with step 422 of FIG. 4 may be adjusted or modified (e.g., incremented, decremented, etc.). Such an adjustment may account for a translation or skew of one of the image prototype and a received glyph relative to the other. The adjustment may be conducted by adding or subtracting an offset value to one or more of the computed bounds. In some embodiments, the computed bounds may be adjusted by multiplying the computed bounds by a number other than one (where a number less than one would tend to contract the computed bounds and a number greater than one would tend to expand the computed bounds).

In some embodiments, the techniques associated with the reduction of bit depth (e.g., step 314 of FIG. 3 and step 416 of FIG. 4) may be modified or altered. For example, when reducing a bitmap to an image, in lieu of using a 50% threshold technique (where a bit is treated as being 'on' if it is black and 'off' if it is white), a different value threshold could be used. For example, a threshold of 75% may be used in some embodiments to compensate for print/ink color and/or paper issues (e.g., mechanical issues) that might be encountered in a real world environment. Different thresholds may be used to fine-tune which bits in a received glyph were 'on' or 'off.'

In some embodiments, a nearest-neighbors algorithm may be used, optionally in connection with a reduction step. For example, a bit value or assignment for a given pixel may be a function of both the corresponding location in a received glyph and neighboring locations to the corresponding location. In this manner, a filtering algorithm may effectively be adopted and may be used to provide an averaging or smoothing effect at transition points in the received glyph.

In some embodiments, the received glyph may be translated (e.g., rotated) in applying the algorithm shown in FIG. 4. Such translation (e.g., rotation) may be used to compensate for mechanical or human error in generating the glyph. For example, if the glyph was generated as a result of a scanning process, rotation could be performed on the received glyph to compensate for inadvertent rotation of the glyph when it was scanned.

In some embodiments, the lowest score determined in connection with step 8 of FIG. 5 will correspond to the image prototype that is used. In some embodiments, it may be advantageous to use another score instead of the lowest score. For example, if the difference between the lowest score and the second lowest score in some embodiments is less than a threshold value, an audiovisual prompt may present the image prototypes corresponding to the lowest and second lowest scores and may request a user to select one of the image prototypes.

In some embodiments, licensing terms may be considered in determining which image prototype to use. For example, the lowest score in connection with FIG. 5 (step 8) may correspond to an image prototype with onerous or burdensome licensing terms, whereas the second lowest score may correspond to an image prototype with more favorable licensing terms. In those embodiments, if the difference in licensing terms between the two image prototypes is greater than a threshold value, the image prototype corresponding to the second lowest score may be used.

The above described criteria (the use of thresholds, licensing terms, etc.), in addition to other criteria, may be used in some embodiments to break ties between scores.

Although not required, one of ordinary skill in the art will appreciate that various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light and/or electromagnetic waves traveling through signal-conducting media such as metal wires, optical fibers, and/or wireless transmission media (e.g., air and/or space). In general, the one or more computer-readable media may comprise one or more transitory and/or non-transitory computer-readable media.

As described herein, the various methods and acts may be operative across one or more computing servers and one or more networks. The functionality may be distributed in any manner, or may be located in a single computing device (e.g., a server, a client computer, etc.). As discussed herein, techniques may be used to match a received glyph to one or more candidate image prototypes.

As described herein, the methodological acts and processes may be tied to particular machines or apparatuses. For example, as described herein, a user computer, a server, or the like may be used in various embodiments of this disclosure to match a received glyph to one or more candidate image prototypes. More generally, one or more computers may include one or more processors and memory storing instructions, that when executed, perform the methodological acts and processes described herein. Furthermore, the methodological acts and processes described herein may perform a variety of functions including transforming an article (e.g., a received glyph) into a different state or thing (e.g., a rendered or displayed glyph having characteristics or properties associated with one or more image prototypes).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A method, comprising:
   receiving, by at least one computing device, a glyph;
   reducing, by the at least one computing device, the received glyph to a predefined format;
   normalizing, by the at least one computing device, the reduced glyph;
   comparing, by the at least one computing device, the normalized glyph to a plurality of image prototypes; and
   outputting, by the at least one computing device, at least one of the plurality of image prototypes based on the comparison of the normalized glyph to the plurality of image prototypes,
   wherein comparing the normalized glyph to the plurality of image prototypes includes:
      determining a number of rows in the normalized glyph and a number of rows in a selected one of the plurality of image prototypes;
      for the lesser of the number of rows in the normalized glyph and the number of rows in the selected one of the plurality of image prototypes, exclusive-or'ing (xor'ing) pixels of the normalized glyph with corresponding pixels of the selected one of the plurality of image prototypes;
      accumulating a result of the xor'ing of the pixels of the normalized glyph with the corresponding pixels of the selected one of the plurality of image prototypes;
      for each row of the normalized glyph and the selected one of the plurality of image prototypes that was not xor'ed, adding to the result a number corresponding to the number of pixels 'on' in the normalized glyph or the selected one of the plurality of image prototypes; and
      saving the added result.

2. The method of claim 1, wherein reducing the received glyph to a predefined format comprises reducing the received glyph to a 1-bit depth bitmap format.

3. The method of claim 1, wherein normalizing the reduced glyph comprises normalizing the reduced glyph to a predefined width and a proportional height.

4. The method of claim 3, wherein each of the plurality of image prototypes are normalized to the predefined width.

5. The method of claim 1, further comprising:
   storing, by the at least one computing device, the plurality of image prototypes in a repository.

6. The method of claim 1, wherein comparing the normalized glyph to the plurality of image prototypes further includes:
   determining a number of rows in at least a second selected one of the plurality of image prototypes;
   for the lesser of the number of rows in the normalized glyph and the number of rows in the at least second selected one of the plurality of image prototypes, exclusive-or'ing (xor'ing) pixels of the normalized glyph with corresponding pixels of the at least second selected one of the plurality of image prototypes;
   accumulating at least a second result of the xor'ing of the pixels of the normalized glyph with the corresponding pixels of the at least second selected one of the plurality of image prototypes;
   for each row of the normalized glyph and the at least second selected one of the plurality of image prototypes that was not xor'ed, adding to the at least second result a number corresponding to the number of pixels 'on' in the normalized glyph or the at least second selected one of the plurality of image prototypes;
   saving the added at least second result; and
   determining a minimum of the added result and the added at least second result.

7. The method of claim 6, wherein the outputting of the at least one of the plurality of image prototypes comprises outputting an image prototype corresponding to the determined minimum of the added result and the added at least second result.

8. The method of claim 1, further comprising:
   computing, by the at least one computing device, bounds associated with the received glyph,
   wherein the normalization of the reduced glyph is based on the computed bounds.

9. One or more non-transitory computer-readable media having instructions stored thereon, that when executed by one or more computers, cause the one or more computers to perform:
   receiving a glyph;
   reducing the received glyph to a predefined format;
   normalizing the reduced glyph;
   comparing the normalized glyph to a plurality of image prototypes; and
   outputting at least one of the plurality of image prototypes based on the comparison of the normalized glyph to the plurality of image prototypes,
   wherein comparing the normalized glyph to the plurality of image prototypes includes:
      determining a number of rows in the normalized glyph and a number of rows in a selected one of the plurality of image prototypes;
      for the lesser of the number of rows in the normalized glyph and the number of rows in the selected one of the plurality of image prototypes, exclusive-or'ing (xor'ing) pixels of the normalized glyph with corresponding pixels of the selected one of the plurality of image prototypes;

accumulating a result of the xor'ing of the pixels of the normalized glyph with the corresponding pixels of the selected one of the plurality of image prototypes;

for each row of the normalized glyph and the selected one of the plurality of image prototypes that was not xor'ed, adding to the result a number corresponding to the number of pixels 'on' in the normalized glyph or the selected one of the plurality of image prototypes; and saving the added result.

10. The one or more non-transitory computer-readable media of claim 9, wherein the instructions, when executed by the one or more computers, cause the one or more computers to perform:

reducing the received glyph to a 1-bit depth bitmap format.

11. The one or more non-transitory computer-readable media of claim 9, wherein the instructions, when executed by the one or more computers, cause the one or more computers to perform:

normalizing the reduced glyph to a predefined width and a proportional height.

12. The one or more non-transitory computer-readable media of claim 9, wherein comparing the normalized glyph to the plurality of image prototypes further includes:

determining a number of rows in at least a second selected one of the plurality of image prototypes;

for the lesser of the number of rows in the normalized glyph and the number of rows in the at least second selected one of the plurality of image prototypes, exclusive-or'ing (xor'ing) pixels of the normalized glyph with corresponding pixels of the at least second selected one of the plurality of image prototypes;

accumulating at least a second result of the xor'ing of the pixels of the normalized glyph with the corresponding pixels of the at least second selected one of the plurality of image prototypes;

for each row of the normalized glyph and the at least second selected one of the plurality of image prototypes that was not xor'ed, adding to the at least second result a number corresponding to the number of pixels 'on' in the normalized glyph or the at least second selected one of the plurality of image prototypes;

saving the added at least second result; and determining a minimum of the added result and the added at least second result.

13. The one or more non-transitory computer-readable media of claim 12, wherein the outputting of the at least one of the plurality of image prototypes comprises outputting an image prototype corresponding to the determined minimum of the added result and the added at least second result.

14. An apparatus, comprising:

at least one processor; and memory storing instructions that, when executed by the at least one processor, cause the apparatus to perform:

receiving a glyph;

reducing the received glyph to a predefined format;

normalizing the reduced glyph;

comparing the normalized glyph to a plurality of image prototypes; and outputting at least one of the plurality of image prototypes based on the comparison of the normalized glyph to the plurality of image prototypes, wherein comparing the normalized glyph to the plurality of image prototypes includes:

determining a number of rows in the normalized glyph and a number of rows in a selected one of the plurality of image prototypes;

for the lesser of the number of rows in the normalized glyph and the number of rows in the selected one of the plurality of image prototypes, exclusive-or'ing (xor'ing) pixels of the normalized glyph with corresponding pixels of the selected one of the plurality of image prototypes;

accumulating a result of the xor'ing of the pixels of the normalized glyph with the corresponding pixels of the selected one of the plurality of image prototypes;

for each row of the normalized glyph and the selected one of the plurality of image prototypes that was not xor'ed, adding to the result a number corresponding to the number of pixels 'on' in the normalized glyph or the selected one of the plurality of image prototypes; and saving the added result.

15. The apparatus of claim 14, wherein the instructions, when executed by the at least one processor, cause the apparatus to perform:

reducing the received glyph to a 1-bit depth bitmap format.

16. The apparatus of claim 14, wherein the instructions, when executed by the at least one processor, cause the apparatus to perform:

normalizing the reduced glyph to a predefined width and a proportional height.

17. The apparatus of claim 14, wherein the instructions, when executed by the at least one processor, cause the apparatus to perform:

rotating the normalized glyph; and comparing the rotated glyph to the plurality of image prototypes.

18. The apparatus of claim 14, wherein the instructions, when executed by the at least one processor, cause the apparatus to perform:

computing bounds associated with the received glyph, wherein the normalization of the reduced glyph is based on the computed bounds;

translating the computed bounds by an offset amount;

normalizing the reduced glyph based on the translated bounds;

comparing the normalized reduced glyph based on the translated bounds to the plurality of image prototypes;

determining at least one image prototype selected from the plurality of image prototypes that most closely matches the received glyph based on the comparisons; and outputting the determined at least one image prototype.

19. The apparatus of claim 14, wherein the instructions, when executed by the at least one processor, cause the apparatus to perform:

reducing the received glyph based on a nearest-neighbors algorithm.

20. The apparatus of claim 14, wherein comparing the normalized glyph to the plurality of image prototypes further includes:

determining a number of rows in at least a second selected one of the plurality of image prototypes;

for the lesser of the number of rows in the normalized glyph and the number of rows in the at least second selected one of the plurality of image prototypes, exclusive-or'ing (xor'ing) pixels of the normalized glyph with corresponding pixels of the at least second selected one of the plurality of image prototypes;

accumulating at least a second result of the xor'ing of the pixels of the normalized glyph with the corresponding pixels of the at least second selected one of the plurality of image prototypes;

for each row of the normalized glyph and the at least second selected one of the plurality of image prototypes that was not xor'ed, adding to the at least second result a number corresponding to the number of pixels 'on' in the normalized glyph or the at least second selected one of the plurality of image prototypes;

saving the added at least second result; and determining a minimum of the added result and the added at least second result.

21. The apparatus of claim 20, wherein the outputting of the at least one of the plurality of image prototypes comprises outputting an image prototype corresponding to the determined minimum of the added result and the added at least second result.

* * * * *